United States Patent [19]
Matsumoto et al.

[11] Patent Number: 5,986,842
[45] Date of Patent: Nov. 16, 1999

[54] MAGNETIC DISK APPARATUS WITH CIRCUIT CAPABLE OF IDENTIFYING INDIVIDUAL SPECIFICATION

[75] Inventors: Akira Matsumoto; Teruyuki Narita, both of Kawasaki, Japan

[73] Assignee: Fujitsu Limited, Kawasaki, Japan

[21] Appl. No.: 08/951,192

[22] Filed: Oct. 15, 1997

[30] Foreign Application Priority Data

Dec. 20, 1996 [JP] Japan .................................. 8-342102

[51] Int. Cl.$^6$ ................................................. G11B 15/18
[52] U.S. Cl. ............................................... 360/69; 360/55
[58] Field of Search ................................. 360/69, 71, 75, 360/70, 55, 32

[56] References Cited

U.S. PATENT DOCUMENTS 5,710,675   1/1998   Goldstone et al. ..................... 360/69

Primary Examiner—Andrew L. Sniezek
Attorney, Agent, or Firm—Greer, Burns & Crain, Ltd.

[57] ABSTRACT

A magnetic disk apparatus is disclosed, in which the product specifications such as the number of heads, the number of disks and the information on the destination of the apparatus can be efficiently, accurately identified by a single circuit. The magnetic disk apparatus comprises an identification circuit that can identify the performance specification information. The identification circuit includes a first resistor circuit arranged on a cable connecting a head actuator and a printed board, a second resistor circuit formed on the printed board and having an end thereof connected to a reference voltage and the other end thereof connected in series to the first resistor circuit, an A/D converter for converting the voltage value at the junction point of the first and second resistor circuits into a digital value of a predetermined number of bits, and a memory for storing in advance the performance specification information and the control information of the magnetic disk apparatus corresponding to a digital value of a predetermined number of bits. The control circuit on the printed board can thus control the magnetic disk apparatus by judging the performance specification information of the magnetic disk apparatus from the output value of the A/D converter and the value stored in the memory.

15 Claims, 12 Drawing Sheets

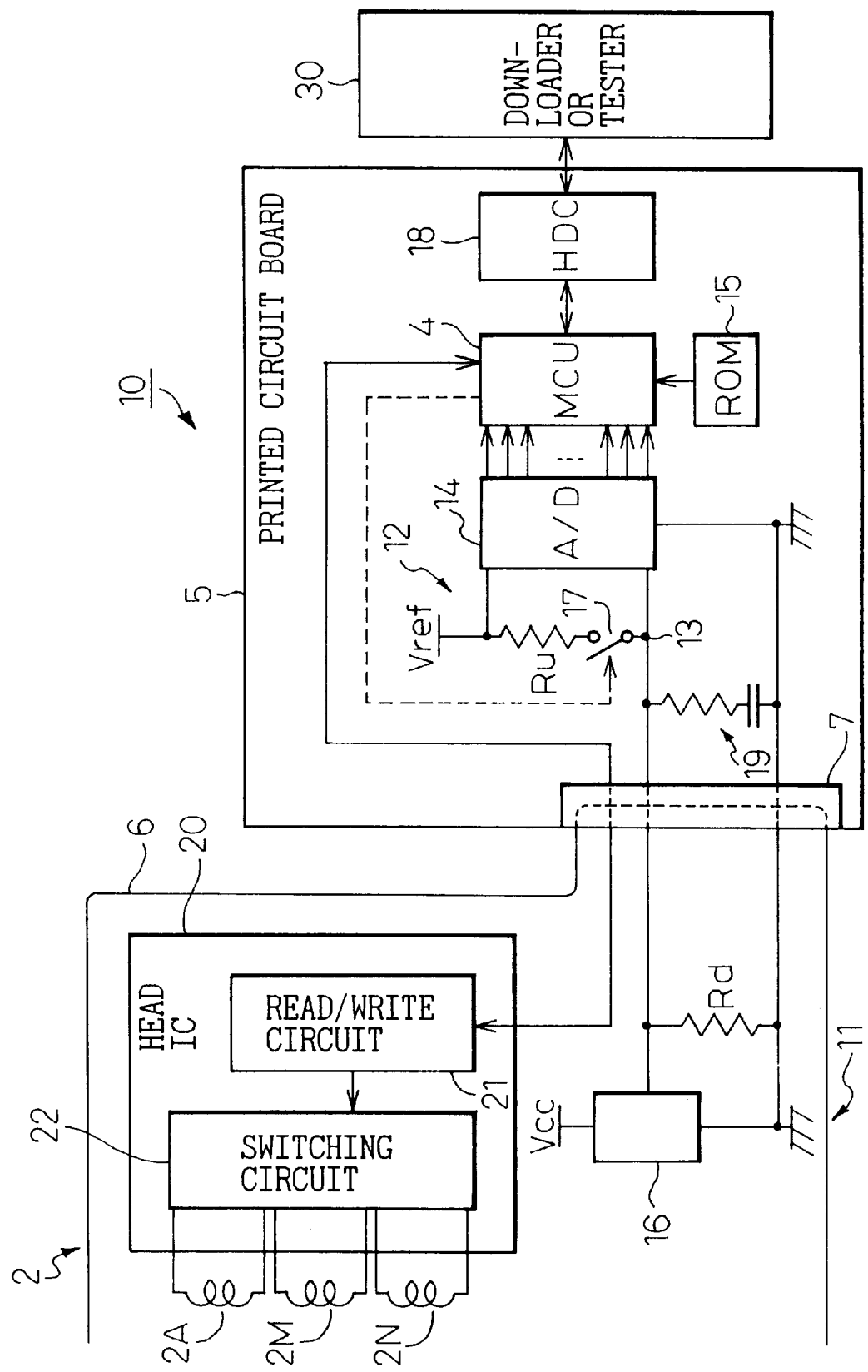

Fig. 8

| PARTIAL VOLTAGE VALUE | DIGITAL OUTPUT | RESISTANCE VALUE | |
|---|---|---|---|
| | | Rd | Ru |
| Vref | 1 1 1 1 1 | A1 | B1 |
| Vref × 31/32 | 1 1 1 1 0 | A2 | B2 |
| Vref × 30/32 | 1 1 1 0 1 | A3 | B3 |
| Vref × 29/32 | 1 1 1 0 0 | A4 | B4 |
| Vref × 28/32 | 1 1 0 1 1 | A5 | B5 |
| Vref × 27/32 | 1 1 0 1 0 | A6 | B6 |
| Vref × 26/32 | 1 1 0 0 1 | A7 | B7 |
| Vref × 25/32 | 1 1 0 0 0 | A8 | B8 |
| Vref × 24/32 | 1 0 1 1 1 | A9 | B9 |
| Vref × 23/32 | 1 0 1 1 0 | A10 | B10 |
| Vref × 22/32 | 1 0 1 0 1 | A11 | B11 |
| Vref × 21/32 | 1 0 1 0 0 | A12 | B12 |
| Vref × 20/32 | 1 0 0 1 1 | A13 | B13 |
| Vref × 19/32 | 1 0 0 1 0 | A14 | B14 |
| Vref × 18/32 | 1 0 0 0 1 | A15 | B15 |
| Vref × 17/32 | 1 0 0 0 0 | A16 | B16 |
| Vref × 16/32 | 0 1 1 1 1 | A17 | B17 |
| Vref × 15/32 | 0 1 1 1 0 | A18 | B18 |
| Vref × 14/32 | 0 1 1 0 1 | A19 | B19 |
| Vref × 13/32 | 0 1 1 0 0 | A20 | B20 |
| Vref × 12/32 | 0 1 0 1 1 | A21 | B21 |
| Vref × 11/32 | 0 1 0 1 0 | A22 | B22 |
| Vref × 10/32 | 0 1 0 0 1 | A23 | B23 |
| Vref × 9/32 | 0 1 0 0 0 | A24 | B24 |
| Vref × 8/32 | 0 0 1 1 1 | A25 | B25 |
| Vref × 7/32 | 0 0 1 1 0 | A26 | B26 |
| Vref × 6/32 | 0 0 1 0 1 | A27 | B27 |
| Vref × 5/32 | 0 0 1 0 0 | A28 | B28 |
| Vref × 4/32 | 0 0 0 1 1 | A29 | B29 |
| Vref × 3/32 | 0 0 0 1 0 | A30 | B30 |
| Vref × 2/32 | 0 0 0 0 1 | A31 | B31 |
| Vref × 1/32 | 0 0 0 0 0 | A32 | B32 |

Fig.9

| | | | | | |
|---|---|---|---|---|---|
| NUMBER OF HEADS | FIFTH BIT | 0 | 0 | 1 | 1 |
| | FOURTH BIT | 0 | 1 | 0 | 1 |
| | | 1 | 2 | 3 | 4 |
| HEAD CHARACTERISTIC | THIRD BIT | 0 | 1 | | |
| | | P CHAR. | Q CHAR. | | |
| NUMBER OF DISKS | SECOND BIT | 0 | 1 | | |
| | | 1 | 2 | | |
| DISK CHARACTERISTIC | FIRST BIT | 0 | 1 | | |
| | | R CHAR. | S CHAR. | | |

Fig.10

| PARTIAL VOLTAGE VALUE | DIGITAL OUTPUT | RESISTANCE VALUE | |
|---|---|---|---|
| | | Rd | Ru |
| Vref × 32/33 | 1 1 1 1 1 | C1 | D1 |
| Vref × 31/33 | 1 1 1 1 0 | C2 | D1 |
| Vref × 30/33 | 1 1 1 0 1 | C3 | D1 |
| Vref × 29/33 | 1 1 1 0 0 | C4 | D1 |
| Vref × 28/33 | 1 1 0 1 1 | C5 | D1 |
| Vref × 27/33 | 1 1 0 1 0 | C6 | D1 |
| Vref × 26/33 | 1 1 0 0 1 | C7 | D1 |
| Vref × 25/33 | 1 1 0 0 0 | C8 | D1 |
| Vref × 24/33 | 1 0 1 1 1 | C9 | D1 |
| Vref × 23/33 | 1 0 1 1 0 | C10 | D1 |
| Vref × 22/33 | 1 0 1 0 1 | C11 | D1 |
| Vref × 21/33 | 1 0 1 0 0 | C12 | D1 |
| Vref × 20/33 | 1 0 0 1 1 | C13 | D1 |
| Vref × 19/33 | 1 0 0 1 0 | C14 | D1 |
| Vref × 18/33 | 1 0 0 0 1 | C15 | D1 |
| Vref × 17/33 | 1 0 0 0 0 | C16 | D1 |
| Vref × 16/33 | 0 1 1 1 1 | C17 | D1 |
| Vref × 15/33 | 0 1 1 1 0 | C18 | D1 |
| Vref × 14/33 | 0 1 1 0 1 | C19 | D1 |
| Vref × 13/33 | 0 1 1 0 0 | C20 | D1 |
| Vref × 12/33 | 0 1 0 1 1 | C21 | D1 |
| Vref × 11/33 | 0 1 0 1 0 | C22 | D1 |
| Vref × 10/33 | 0 1 0 0 1 | C23 | D1 |
| Vref × 9/33 | 0 1 0 0 0 | C24 | D1 |
| Vref × 8/33 | 0 0 1 1 1 | C25 | D1 |
| Vref × 7/33 | 0 0 1 1 0 | C26 | D1 |
| Vref × 6/33 | 0 0 1 0 1 | C27 | D1 |
| Vref × 5/33 | 0 0 1 0 0 | C28 | D1 |
| Vref × 4/33 | 0 0 0 1 1 | C29 | D1 |
| Vref × 3/33 | 0 0 0 1 0 | C30 | D1 |
| Vref × 2/33 | 0 0 0 0 1 | C31 | D1 |
| Vref × 1/33 | 0 0 0 0 0 | C32 | D1 |

Fig.11

| HEAD IC | NUMBER OF HEADS | | CHARACTERISTIC | | | | NUMBER OF DISKS | CHARACTERISTIC | | CUSTOMIZED INFORMATION |
|---|---|---|---|---|---|---|---|---|---|---|
| | | | FIRST HEAD | SECOND HEAD | THIRD HEAD | FOURTH HEAD | | FIRST DISK | SECOND DISK | |
| bit 10 | bit 9 | bit 8 | bit 7 | bit 6 | bit 5 | bit 4 | bit 3 | bit 2 | bit 1 | bit 0 |
| M CO. | 0 | 0 | P CHAR. | P CHAR. | P CHAR. | P CHAR. | | R CHAR. | R CHAR. | T CO. |
| 0 | | | 0 | 0 | 0 | 0 | 0 | 0 | 0 | 0 |
| N CO. | 0 | 1 | Q CHAR. | Q CHAR. | Q CHAR. | Q CHAR. | | S CHAR. | S CHAR. | U CO. |
| 1 | | | 1 | 1 | 1 | 1 | 1 | 1 | 1 | 1 |
| | 1 | 0 | | | | | 2 | | | |
| | 1 | 1 | | | | | | | | |

| Number of heads | bit 9 | bit 8 |
|---|---|---|
| 1 | 0 | 0 |
| 2 | 0 | 1 |
| 3 | 1 | 0 |
| 4 | 1 | 1 |

Fig.12

| SENSOR OUTPUT VOLTAGE | bit9 | bit8 | bit7 | INTERNAL TEMPERATURE OF HOUSING |
|---|---|---|---|---|
| $V_{t1}$ | 0 | 0 | 0 | 0~13°C |
| $V_{t2}$ | 0 | 0 | 1 | 13~25°C |
| $V_{t3}$ | 0 | 1 | 0 | 25~37°C |
| $V_{t4}$ | 0 | 1 | 1 | 37~50°C |
| $V_{t5}$ | 1 | 0 | 0 | 50~100°C |

MAGNETIC DISK APPARATUS WITH CIRCUIT CAPABLE OF IDENTIFYING INDIVIDUAL SPECIFICATION

BACKGROUND OF THE INVENTION

1. Field of the Invention

The present invention relates to a magnetic disk apparatus which is a memory apparatus or, in particular, to a magnetic disk apparatus comprising a performance specification identification circuit capable of identifying the individual performance specification of the magnetic disk apparatus with a simple configuration.

2. Description of the Related Art

In recent years, the performance of a magnetic disk apparatus has come to depend to a large measure on the characteristics of the heads or the magnetic disks providing a storage medium. For this reason, it is necessary to strictly manage the characteristics of the heads and the disks, and the magnetic disks must be used under conditions conforming to the respective characteristics.

The characteristics of the heads and magnetic disks have conventionally been managed mainly on the assembly line for the disk apparatus. Specifically, a worker makes it a practice to visually check the number of the magnetic disks and the number of the heads or the type of the control IC of the magnetic disk apparatus in the process of assembly, and attaches a label or the like conforming to the configuration of the magnetic disk apparatus on the reverse side of the housing to thereby identify the type of the magnetic disk apparatus.

The latest trend, however, is toward an increased number of types of heads and magnetic disks, of the magnetic disk apparatus, which are supplied from a plurality of suppliers. Further, in order to increase the range of articles by changing the storage capacity of the magnetic disk apparatuses, different numbers of heads or magnetic disks are sometimes mounted in the same housing. The characteristics of the heads and the magnetic disks may thus vary from one supplier to another. In the case where the heads and the magnetic disks are purchased from different suppliers, therefore, the characteristics corresponding to the respective parts are preferably recognized by the control circuit of each magnetic disk apparatus to control the apparatus with a control constant most suitable to each part.

With the increased number of combinations of the number and type of the heads and the magnetic disks and the number of the types of the control IC for the control circuit delivered from different suppliers, it has become increasingly difficult to set up or manage individual magnetic disk apparatuses conforming to the respective component elements thereof.

Another current trend is toward an increased use of a composite head including a MR (magnetoresistive) head and an inductive head for the magnetic disk apparatus. The resultant problem is a change in the characteristics of the magnetic disk at low temperatures (deterioration of the overwrite (O/W) characteristic) that adversely affects the data read-write characteristics, and a solution to this problem is desired.

In a magnetic disk apparatus, the signal reproduced by the head is passed out of the housing through a flexible circuit board mounted on the side of the carriage, and led to a printed circuit board arranged on the reverse side of the housing. The head IC and the servo IC for demodulating the read signal supplied by the head are often mounted on the flexible circuit board (hereinafter referred to as the flexible cable).

In the magnetic disk apparatus, the number of the magnetic disks accommodated in the same housing are sometimes changed by a modification to the specification by the supplier of the magnetic disk apparatus. In the case where the head IC for processing the signals from the head or circuit components such as the capacitors and resistors forming the peripheral circuit are mounted on the flexible cable, a separate circuit for identifying the specification information of the magnetic disk apparatus is mounted on each of the flexible cable and the printed circuit board.

The identification circuit for the specification information of the magnetic disk apparatus generally includes a pull-down circuit having a resistor mounted on the flexible cable and a MCU (microcomputer unit) as a control IC for the magnetic disk apparatus mounted on the printed circuit board 79.

This specification information identification circuit for the magnetic disk apparatus can represent two states according to the presence or absence of the resistor in the pull-down circuit. In the case where a magnetic disk apparatus having the same housing specification has two specifications for the magnetic disk, one involving a single magnetic disk, and the other involving two magnetic disks, for example, the two states are distinguished by changing the resistance value of the resistor.

In this method, however, only two states can be represented by each pull-down circuit. If the type and the number of the heads is to be identified in addition to the number of magnetic disks, therefore, an increased number of the pull-down circuits are required, thereby posing the problem of an increased number of connectors, MCU pins and resistors leading to an increased overall cost.

Further, for the specification information to be obtained on the number of each type of magnetic disks and the type and the number of the heads of each magnetic disk in the process of fabrication of a magnetic disk apparatus, such information must be read from the label attached to the individual magnetic disk apparatuses. In the conventional method, the bar code printed on the label is read by a tester, so that a program code and read/write parameters suited to each housing of the magnetic disk apparatus are downloaded.

With regard to the deterioration of the overwrite characteristic at low temperatures which has recently posed a problem, on the other hand, it is known that the read/write characteristic can be improved by increasing the write current. An excessively increased write current, however, is liable to destroy the data in adjacent tracks by write expansion.

A means for solving these problems is disclosed in JP-A-64-79904, JP-A-1-137409 and JP-A-1-166361, in which a resistor is mounted on both the flexible cable in the magnetic disk apparatus and on the printed circuit board (hereinafter referred to simply as the printed board) outside the magnetic disk apparatus. The two resistors are connected in series, so that a reference voltage is applied to them and the partial voltage appearing at the junction point is identified by a voltage comparator.

The method described in the above-mentioned patent publications, however, requires a series-connected resistor and a comparator for detecting a partial voltage at the junction point thereof for each identification item of the magnetic disk apparatus. For identifying a multiplicity of items, therefore, a correspondingly increased number of voltage comparators are required, giving rise to a new problem of an increased size and hence an increased cost.

Another problem of the method described in the above-mentioned patent publications is that the internal temperature of the housing of the magnetic disk apparatus cannot be detected and therefore the deterioration in the overwrite characteristic at low temperatures cannot be prevented.

SUMMARY OF THE INVENTION

Accordingly, an object of the present invention is to provide a magnetic disk apparatus in which the type and the number of heads and magnetic disks and many states such as customized information can be efficiently and positively identified by a single circuit.

Another object of the invention is to provide a magnetic disk apparatus in which the read/write characteristic at low temperatures can be improved using the above-mentioned circuits while avoiding write expansion to adjacent magnetic tracks.

According to one aspect of the invention, there is provided a magnetic disk apparatus comprising resistor circuits on both a printed board and a circuit from the cable to the head actuator, which resistor circuits are connected in series and supplied with a reference voltage. A partial voltage appearing at the junction point of the resistor circuits is A/D converted, and the magnetic disk information is identified, by a control circuit, from the digital value thus obtained.

If the magnetic disk information identified by the control circuit can be recognized by a tester in the process of fabrication, an appropriate program code and a read/write parameter can be written without reading the label on the one hand, and detailed data can supplied for quality control of the magnetic disk apparatus at the same time.

According to a second aspect of the invention, there is provided a magnetic disk apparatus in which the internal temperature of the housing of the magnetic disk apparatus is detected, and the write current to the head is controlled by the control circuit on the basis of the detected temperature. Specifically, while avoiding write expansion, the read/write characteristic at low temperatures is improved by increasing the write current to the head when the internal temperature of the housing is low, and by decreasing the write current when the internal temperature is high.

BRIEF DESCRIPTION OF THE DRAWINGS

The present invention will be more clearly understood from the description as set forth below with reference to the accompanying drawings, wherein:

FIG. 6 is a block diagram showing a circuit configuration of an identification unit of a magnetic disk apparatus according to a first embodiment of the invention;

FIG. 8 is a table showing partial voltage values at the junction of the first and second resistor circuits, example combinations of the resistance values of the first and second resistor circuits for realizing the respective partial voltages, and examples of digital outputs of the A/D converter corresponding to the respective partial voltages in a magnetic disk apparatus according to the invention;

FIG. 9 is a table showing an example identification of the characteristics of a magnetic disk apparatus stored in the ROM of FIG. 6 when the partial voltage at the junction point of the first and second resistor circuits of the identification circuit shown in FIG. 6 assumes the state shown in FIG. 8;

FIG. 10 is a table showing partial voltage values at the junction point of the first and second resistor circuits, example resistance values of the second resistor circuit for realizing the respective partial voltage values, and examples of digital outputs of the A/D converter corresponding to the respective partial voltages when the resistance value of the first resistor circuit is fixed in a magnetic disk apparatus according to the invention;

FIG. 11 is a table showing still another example identification of the characteristics of a magnetic disk apparatus stored in the ROM of FIG. 6; and FIG. 12 is a diagram showing the relation between the digital value stored in the ROM of FIG. 6 and the temperature characteristics of the magnetic disk apparatus.

DESCRIPTION OF THE PREFERRED EMBODIMENTS

Before describing the preferred embodiments, an explanation will be given of the conventional magnetic disk drive shown in FIGS. 1 to 4.

Figure 1A:
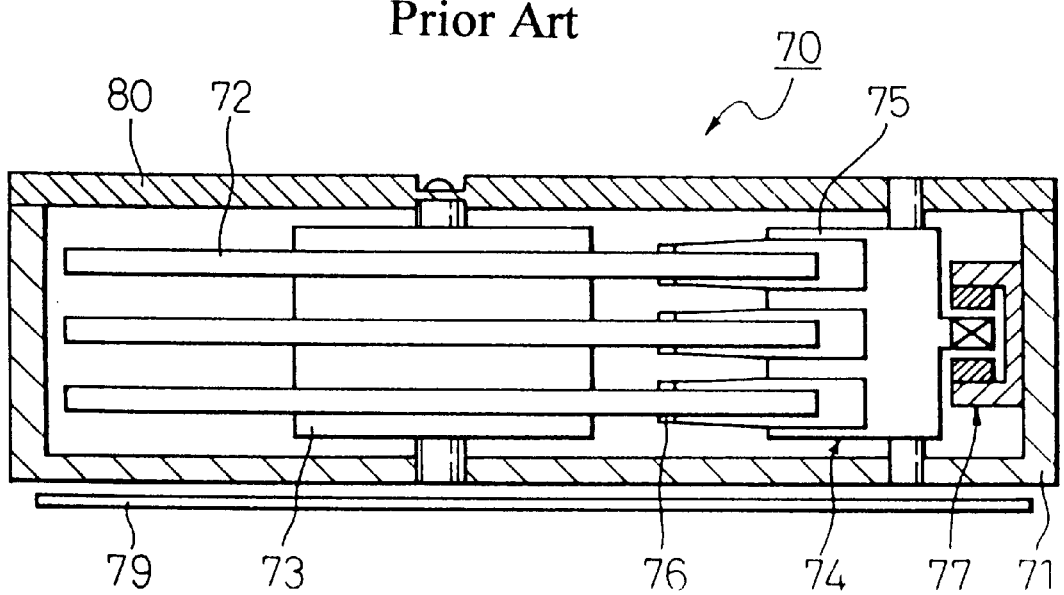
FIG. 1A is a sectional view showing an example configuration of a conventional magnetic disk apparatus comprising a housing containing three magnetic disks.

FIG. 1A shows an example of a structure of a conventional magnetic disk apparatus 70. In FIG. 1A, reference numeral 71 designates a base, numeral 72 a plurality of magnetic disks, numeral 73 a spindle motor for rotating the disks 72, numeral 74 an actuator including a carriage 75 having heads 76 at the forward end thereof and a voice coil motor 77, numeral 79 a printed board for mounting a control circuit of the magnetic disk apparatus 70, and numeral 80 a cover.

With this magnetic disk apparatus 70, the signals reproduced by the heads 76 are passed out of the base 71 on a flexible circuit board, not shown, mounted on the side of the carriage 75, and introduced onto the printed board 79 arranged on the reverse side of the base 71. A head IC and a servo IC for demodulating the read signals supplied by the heads 76 are mounted in many cases on the flexible circuit board (hereinafter referred to as the flexible cable).

Figure 1B:
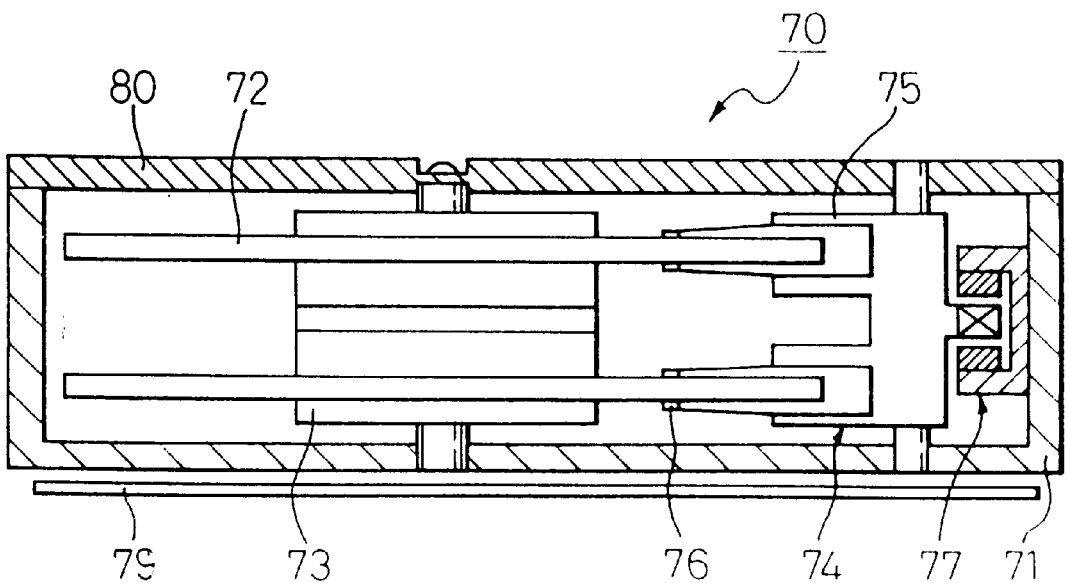
FIG. 1B is a sectional view showing an example configuration of a conventional magnetic disk apparatus with the same housing containing two magnetic disks.

FIG. 1B shows a configuration of the magnetic disk apparatus 70 of FIG. 1A in which the number of the magnetic disks 72 is reduced by one. In FIG. 1B, the same component members as in FIG. 1A are designated by the same reference numerals, respectively. In this way, the number of the magnetic disks 72 in the same base 72 is sometimes changed depending on the specification of the supplier of the magnetic disk apparatus 70.

Figure 2:
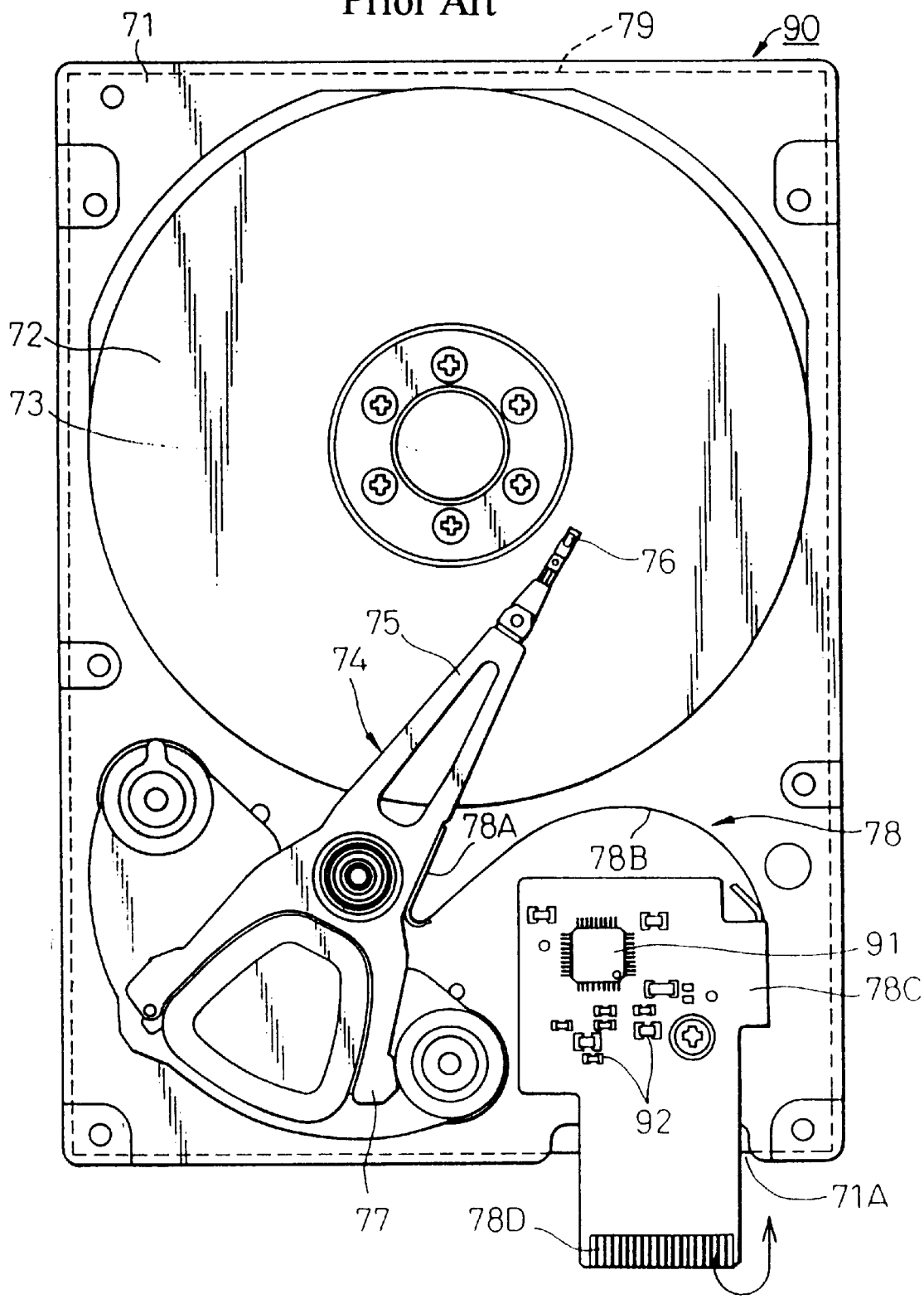
FIG. 2 is a plan view showing a configuration of a conventional magnetic disk apparatus.

FIG. 2 shows another example configuration of a conventional magnetic disk apparatus 90. The same component members in this magnetic disk apparatus as those included in the magnetic disk apparatuses shown in FIGS. 1A, 1B are designated by the same reference numerals, respectively. Thus, numeral 71 designates a base, numeral 72 a plurality of magnetic disks, numeral 73 a spindle motor, numeral 74 an actuator including a carriage 75 with a head 76 at the forward end thereof and a voice coil motor 77, numeral 78 a flexible cable, and numeral 79 a printed board arranged on the reverse side of the base 71.

Figure 3:
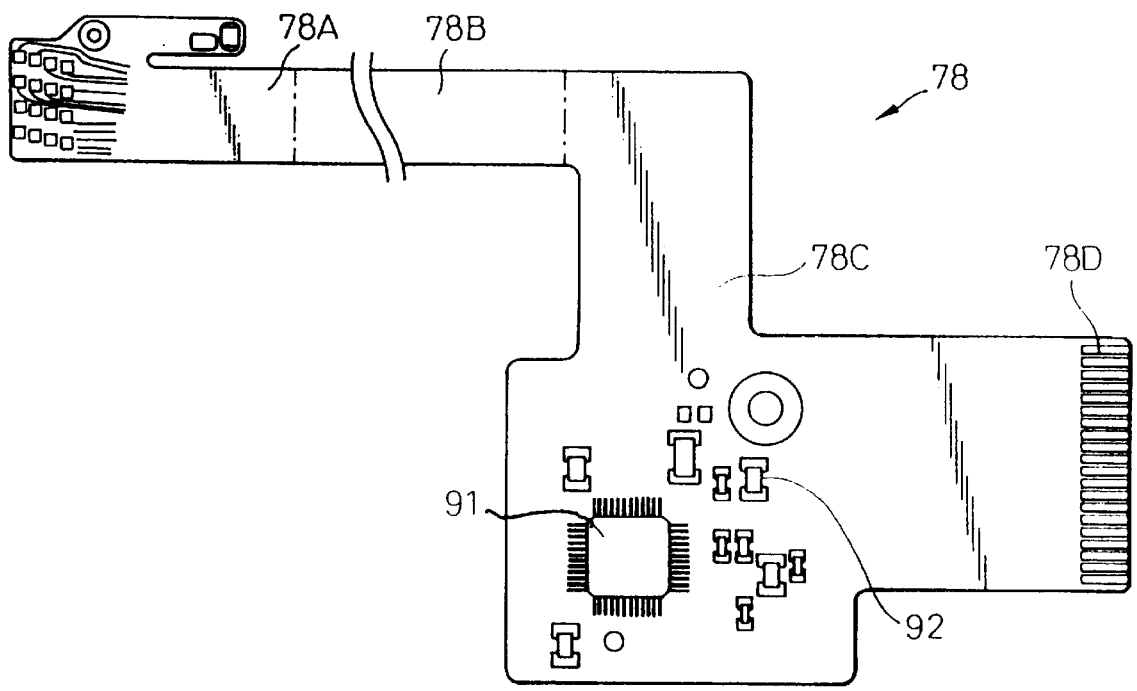
FIG. 3 is a development of a flexible circuit board of the magnetic disk apparatus shown in FIG. 2.

The flexible cable 78 used with this magnetic disk apparatus 90, as shown in FIG. 3, includes a movable portion (carriage-mount) 78A mounted on the side of the carriage 75, a curved portion 78B connected to the movable portion 78A, a fixed portion (base portion) 78C connected at right angles to the end of the curved portion 78B, and a connector 78D formed at the tip of an extended forward end of the fixed portion 78C. The area of the fixed portion 78C is so large that a head IC 91 for processing the signals from the heads and circuit components 92 such as capacitors and resistors constituting the peripheral circuit of the head IC 91 are mounted on the fixed area 78C. A small signal from each head is applied through a circuit pattern formed of the movable portion 78A, the curved portion 78B and the fixed portion 78C and amplified by the head IC 91 mounted on the fixed part 78C.

The flexible cable 78, configured in this way, as shown in FIG. 2, has the fixed portion 78A thereof mounted on the side of the carriage 75, the curved portion 78B thereof is folded back and led out of the carriage 75, and the fixed portion 78C thereof is fixed on the base 71 by being bent by 90° with respect to the curved portion 78B. At the same time, the connector 78D is protruded out of the base 71, and the protrusion is bent toward the reverse side of the base 71 and connected to a connector not shown mounted on the printed board 79 through a recess 71A formed in the base 71.

As described above, a head IC for handling the signals from the heads 76 is arranged on the flexible cable 78 of the conventional magnetic disk apparatuses 70, 90. The circuit for identifying the specification information of the magnetic disk apparatuses 70, 90 is arranged in two parts, one on the flexible cable 78 and the other on the printed board 79.

Figure 4:
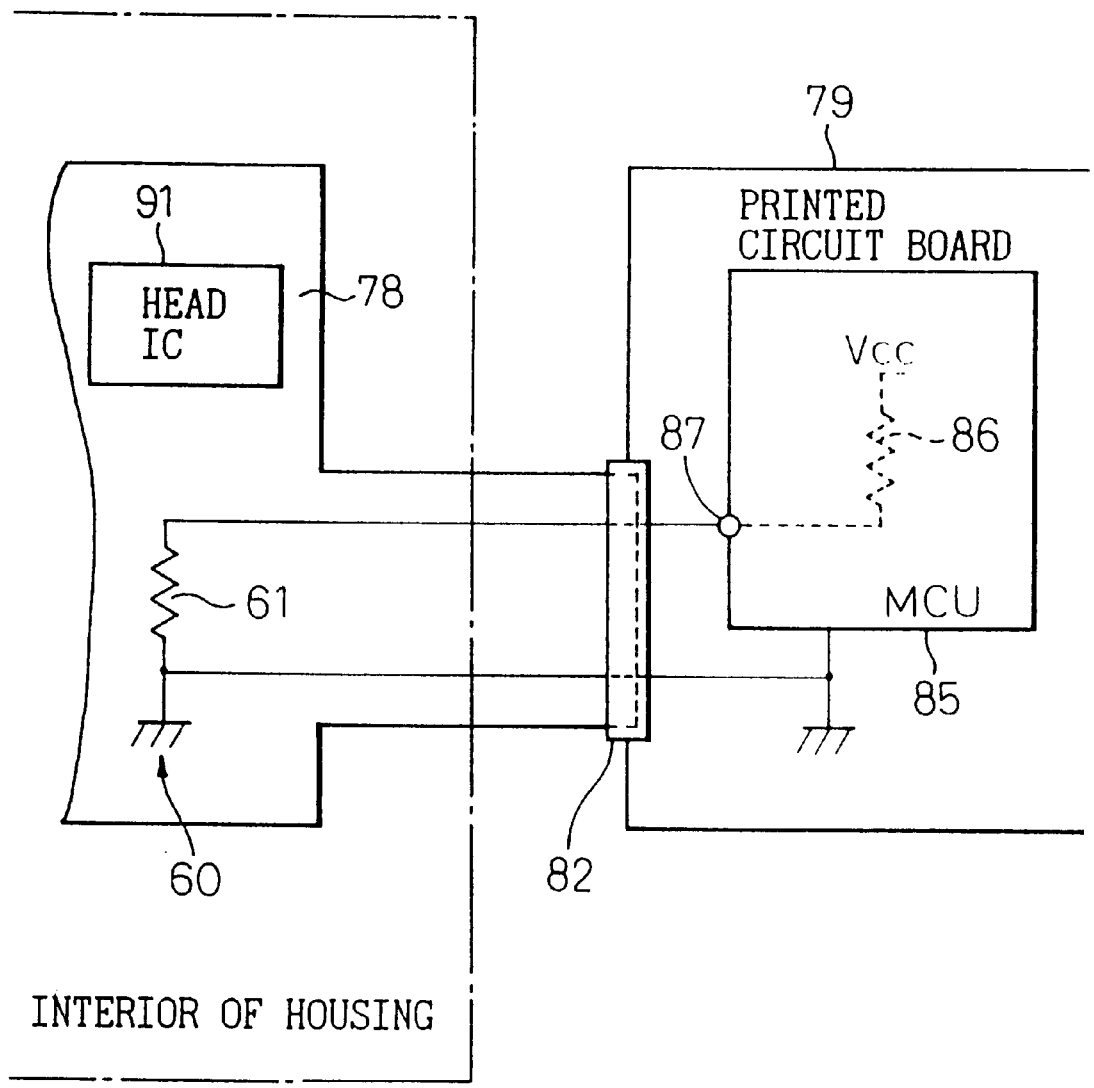
FIG. 4 is a circuit diagram showing a configuration of a conventional circuit for identifying the characteristics of a magnetic disk apparatus.

FIG. 4 shows a configuration of a specification information identification circuit of a conventional magnetic disk apparatus. In the conventional magnetic disk apparatuses 70, 90, as shown in FIG. 4, a pull-down circuit 60 including a resistor 61 is arranged on the flexible cable 78. This pull-down circuit 60 is connected to a MCU (microcomputer unit) 85 constituting a control IC of the magnetic disk apparatus through a connector 82 arranged on the flexible cable 78 and the printed board 79. The resistor 61 connected to the ground of the pull-down circuit 60 has an end thereof connected to the ground in the printed board 79, and the other end of the resistor 61 is connected to a power supply Vcc through a pull-up resistor 86 in the MCU 85.

The specification information identification circuit of the magnetic disk apparatus configured as described above can represent two states according the presence or absence of the resistor 61 in the pull-down circuit 60. Assume, for example, that the magnetic disk apparatus having the same housing specification has two specifications, one magnetic disk and two magnetic disks. In the case where only one magnetic disk is included in the specification, a resistor (whose resistance is approximately 0Ω) is installed, while if the specification covers two magnetic disks, no resistor is installed. The voltage at the port terminal 87 of the MCU 85, therefore, is 0V when one magnetic disk is involved, and 5V when there are two magnetic disks. It can thus be determined that when the logic level is L (low level), one magnetic disk is used, while when the logic level is H (high level), two magnetic disks are used.

This method can represent only two states for each pull-down circuit 60. If the type or the number of the heads is to be identified in addition to the number of magnetic disks, however, the number of the pull-down circuits must be increased accordingly, thereby leading to the problem of the requirement for an increased number of the connectors 82, the pins of the MCU 85 and the resistors 61 and a higher cost.

Further, if the specification information such as the number of magnetic disks and the type and number of heads for each magnetic disk is to be obtained for each magnetic disk in the fabrication process of the magnetic disk apparatus, such information must be read from the label attached. In the prior art, the bar code printed on the label is read by a tester, so that a program code and a read/write parameter suitable for each housing of the magnetic disk apparatus is downloaded.

With regard to the deterioration of the overwrite characteristic at low temperatures which has recently posed a problem, on the other hand, the read/write characteristics are known to be improved by increasing the write current. If the write current is increased excessively, however, the data in adjacent tracks may be destroyed by write expansion.

A means for solving these problems is proposed, for example, in JP-A-64-79904, JP-A-1-137409 and JP-A-1-166361, in which a resistor is arranged on both the flexible cable in the magnetic disk apparatus and a printed circuit board (hereinafter referred to simply as the printed board) outside the magnetic disk apparatus, and these resistors are connected in series and supplied with a reference voltage thereby to identify the partial voltage appearing at the junction point by a voltage comparator.

In the method described in the above-mentioned patent publications, however, series-connected resistors and a comparator for detecting the partial voltage at the junction point thereof are required for each item of identification of the magnetic disk apparatus. For identifying many items, therefore, an increased number of voltage comparators is required, resulting in the new problem of an increased circuit size and cost.

Also, the method described in the above-mentioned patent publications cannot detect the internal temperature of the housing of the magnetic disk apparatus, and therefore another problem is that the deterioration of the overwrite characteristics at low temperatures cannot be prevented.

Preferred embodiments of the present invention will be specifically described below with reference to the accompanying drawings.

Figure 5:
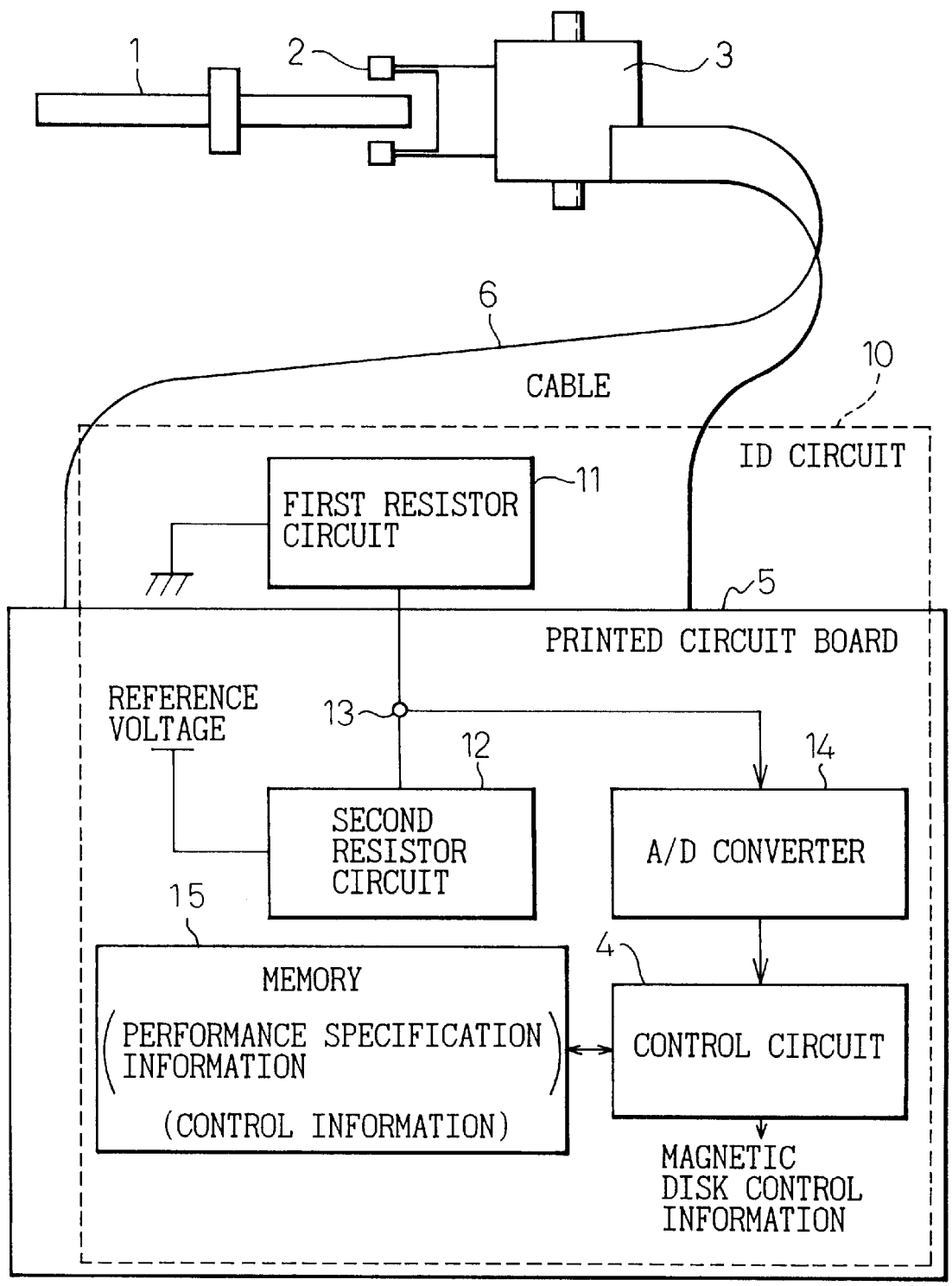
FIG. 5 is a diagram showing a basic configuration of a magnetic disk apparatus according to the present invention.

FIG. 5 shows a basic configuration of a magnetic disk apparatus according to the present invention. As shown in FIG. 5, according to the present invention, there is provided a magnetic disk apparatus comprising a housing, at least a magnetic disk 1, at least a head 2, an actuator 3 for moving the head 2, and a printed board 5 having mounted thereon a control circuit 4 arranged in the housing for processing the write signal to the head 2 or the read signal from the head, wherein the actuator 3 and the control circuit 4 are connected by a cable 6, the apparatus further comprising an identification circuit 10 capable of identifying the specification information of the magnetic disk apparatus. The specification information identification circuit 10 includes a first resistor circuit 11 of a predetermined resistance value mounted on the cable 6 or on the actuator 3 and having an end thereof grounded, a second resistor circuit 12 of a predetermined resistance value arranged on the printed board 5 with one end thereof connected to the reference voltage of the printed board and the other end thereof connected to the other end of the first resistor circuit through the cable, an A/D converter 14 for converting the voltage value appearing at the junction point 13 between the first resistor circuit 11 and the second resistor circuit 13 into a digital value having a predetermined number of bits corresponding to the magnitude of the voltage value and outputting the digital value, and a memory 15 having stored therein the specification information of the magnetic disk apparatus corresponding to the digital value having a predetermined number of bits output from the A/D converter 14 and the control information corresponding to the particular specification information, wherein the control circuit 4 connected to the A/D converter 14 and the memory 15 judges the specification information of the magnetic disk apparatus from the output value of the A/D converter 14 and the value stored in the memory 15, so that the magnetic disk apparatus is controlled by the control information corresponding to the specification information stored in the memory 15.

In this configuration, according to the first aspect of the invention, the voltage value at the junction point corresponding to all the specification information of the magnetic disk apparatus, a combination of the first resistor circuit 11 and the second resistor circuit 12 for producing the particular voltage value are predetermined, and the first resistor circuit 11 and the second resistor circuit 12 are mounted at the time of fabricating the magnetic disk apparatus according to the specification of the magnetic disk apparatus.

The first resistor circuit 11 and the second resistor circuit 12 can each be configured of a single resistor or a combination of a plurality of resistors. Further, the resistance value of one of the resistor circuits can be fixed while the resistance value of the other resistor circuit can be made variable thereby to determine the voltage value at the junction point.

The apparatus is also so configured that in the case where the disk and head characteristics are stored in a memory for each disk and head, the control unit is configured to disregard the bit information for storing the characteristics of an absent disk or head.

Furthermore, the specification information of the magnetic disk apparatus constitutes at least one of the pieces of information including the number of the magnetic disks 1, the number of the heads 2, the type of the disk, the head characteristics, information on the head control circuit and information on the user of the apparatus. The number of bits corresponding to the number of the pieces of the specification information thus identified is contained in the digital signal output from the A/D converter 14.

In addition, the apparatus according to the second aspect of the invention having the above-mentioned configuration comprises a temperature sensor 16 having a high internal impedance connected in parallel to the first resistor circuit 11, a change-over switch 17 inserted between the junction point of the first and second resistor circuits 11, 12 and the second resistor circuit 12, and a memory 15 having stored therein the temperature information corresponding to the digital value of a predetermined number of bits output from the A/D converter 14, wherein when the change-over switch 17 is closed, the control circuit 4 judges the specification information of the magnetic disk apparatus from the output value of the A/D converter 14 and the value stored in the memory 15, while when the change-over switch 17 is open, on the other hand, the output of the A/D converter 14 is monitored to detect the internal temperature of the housing at regular intervals of time. In this second aspect of the invention, the write current to the magnetic disk 1 is set from time to time by the control circuit 4 based on the internal temperature of the housing detected.

FIG. 6 is a block diagram showing a circuit configuration of an identification circuit of a magnetic disk apparatus according to an embodiment of the present invention.

In FIG. 6, numeral 6 designates a flexible cable for connecting the actuator 3 and the printed board 5 described with reference to FIG. 5. The flexible cable 6 has arranged thereon, as in the conventional magnetic disk apparatus 90 described with reference to FIGS. 2 and 3, a head IC 20 for processing the signals produced from each head unit 2 including a plurality of heads 2A to 2N and circuit components (not shown) including capacitors and resistors making up the peripheral circuit of the head IC 20. The head IC 20 contains therein a read/write circuit 21 and a switching circuit 22 for setting one of the heads 2A to 2N in a connected state. Although only the inductive head is shown in FIG. 6, the heads 2A to 2N each constitute a write-only head in the case of a composite head combined with the MR head.

According to the present invention, the first resistor circuit 11 is arranged on the flexible cable 6. The first resistor circuit 11 includes a resistor Rd and a temperature sensor 16 in this embodiment. An end of the resistor Rd is grounded, and the other end thereof is connected to a print circuit 5 described later by the flexible cable 6. This temperature sensor 16 is connected in parallel with the resistor Rd on the one hand and is connected to a power supply Vcc on the other hand. The temperature sensor 16 has so high an internal impedance that when it is connected in parallel with the resistor Rd at room temperature, the value of the combined resistance of the temperature sensor 16 and the resistor Rd is substantially equal to the resistance value of the resistor Rd.

The flexible cable 6 configured as described above is connected to the printed board 5 through a connector 7.

The printed board 5 comprises therein a second resistor circuit 12 connected to the first resistor circuit 11 on the flexible cable 6, an A/D converter 14 for A/D converting the voltage of the junction point 13 of the second resistor circuit 12 and the first resistor circuit 11, a control circuit (a microcomputer unit (hereinafter referred to as the MCU) in this case) 4 impressed with the digital signal output from the A/D converter 14, a read-only memory (hereinafter referred to as the ROM) 15 for storing the specification information of the magnetic disk apparatus corresponding to the digital output of the A/D converter 14, a hard disk controller (HDC) 18 and a filter circuit 19.

The second resistor circuit 12 includes a resistor Ru and a change-over switch 17 according to this embodiment. The resistor Ru has an end thereof connected to a reference power supply Vref, and the other end thereof connected to a junction point 13 with the resistor Rd on the flexible cable 6 through the change-over switch 17. The change-over switch 17 can be composed of a semiconductor switch such as a FET. As a result, a partial voltage value Vd of the reference voltage Vref obtained by voltage division based on the ratio between the resistance value of the first resistor circuit 11 and the resistance value of the second resistor circuit 12 appears at the junction point 13. A filter circuit 19 including a resistor and a capacitor is inserted between the junction point 13 and the ground.

The A/D converter 14 is interposed between the reference voltage Vref and the ground, and has an input terminal thereof supplied with the voltage value at the junction point 13. The A/D converter 14 converts the analog voltage at the junction point 13 to a digital signal of a predetermined number of bits. The number of bits of the digital value output from the A/D converter 14 is determined in accordance with the number of specifications of the magnetic disk apparatus identified by the identification circuit 10. If the number of specifications of the magnetic disk apparatus is 16 (16 types), for example, the number of bits is determined as 4 ($2^4$=16) or more.

The MCU 14 judges the specification of the magnetic disk apparatus in accordance with the digital signal applied thereto from the A/D converter 14. This judgement is carried out by reference to the ROM 15 storing the specification according to the combinations of "0" and "1" of the digital signal. In accordance with the specification of this magnetic disk apparatus, the head IC 20 is controlled by the MCU 4. Also, the on/off operation of the change-over switch 17 is also controlled by the MCU 4. The output of the MCU 14 is produced through a HDC 18 and, according to this embodiment, is applied to a down-loader or a tester 30.

In the above-mentioned embodiment, the resistance values of the first resistor circuit 11 and the second resistor circuit 12 were determined by a single resistor Rd, Ru, respectively. The number of resistors constituting the first resistor circuit 11 and the second resistor circuit 12, however, is not limited to unity. Instead, a plurality of resistors can be connected in parallel or in series to determine a resistance value.

Figure 7A:
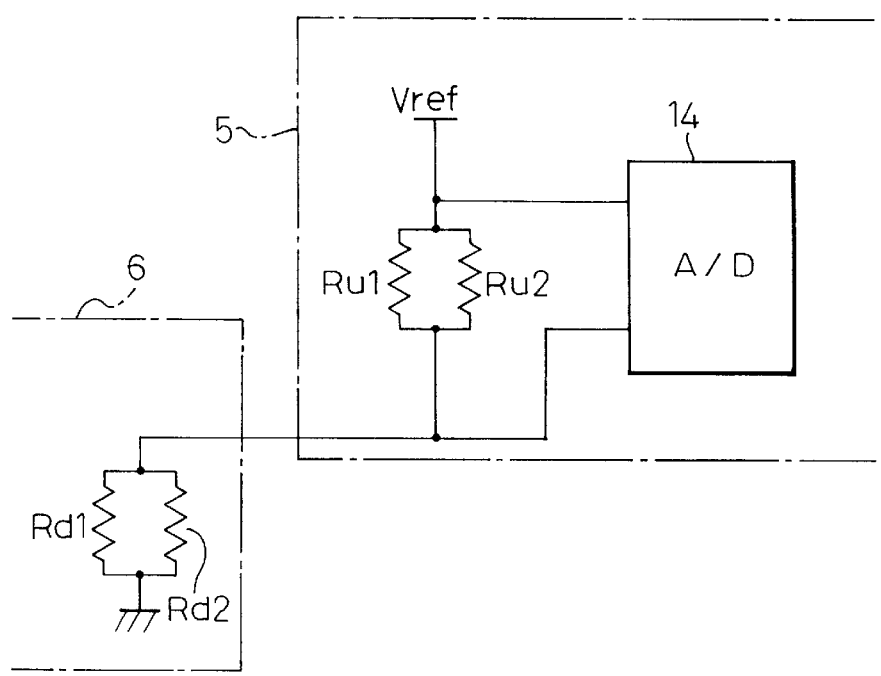
FIG. 7A is a circuit diagram showing a configuration comprising an identification circuit including parallel-connected first and second resistor circuits of a magnetic disk apparatus according to a second embodiment of the invention.
Figure 7B:
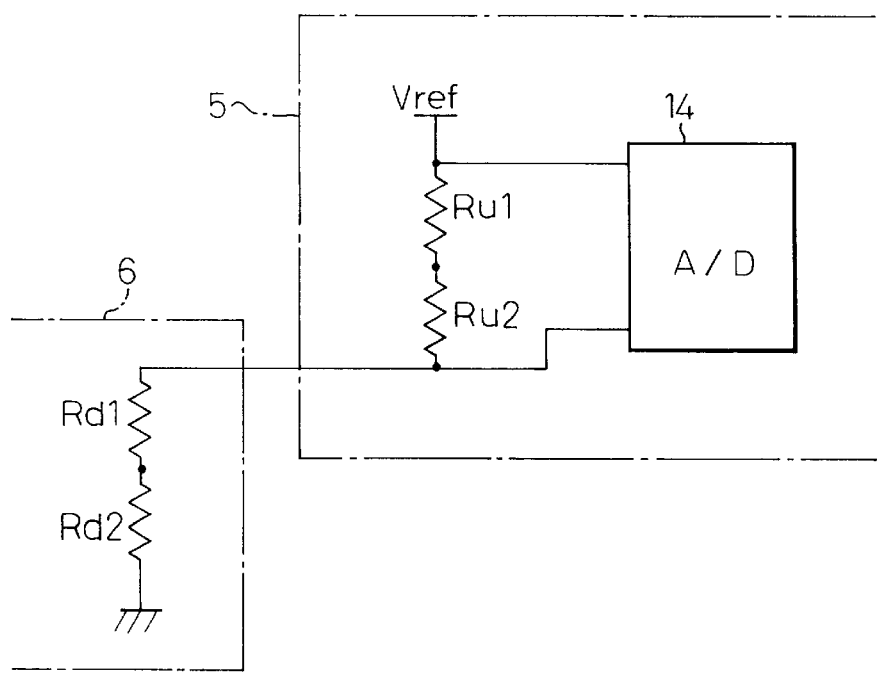
FIG. 7B is a circuit diagram showing a configuration of a magnetic disk apparatus comprising an identification circuit including series-connected first and second resistor circuits according to a third embodiment of the invention.

FIG. 7A shows an embodiment in which the resistance value of the first resistor circuit 11 is determined as a combined resistance of resistors Rd1 and Rd2 connected in parallel, and the resistance of the second resistor circuit 12 determined by a combined resistance of resistors Ru1, Ru2. On the other hand, FIG. 7B shows an embodiment in which the resistance value of the first resistor circuit 11 is determined by a combined resistance of the resistors Rd1, Rd2 connected in series, and the resistance value of the second resistor circuit 12 is determined by a combined resistance of the resistors Ru1, Ru2 connected in series. According to the embodiments shown in FIGS. 7A, 7B, the first resistor circuit 11 includes no temperature sensor 17, and hence no change-over switch 17.

FIG. 8 shows a table showing the partial voltage values at the junction point 13 of the first resistor circuit 11 and the second resistor circuit 12, example combinations of the resistance values of the resistors Rd, Ru of the first resistor circuit 11 and the second resistor circuit 12 for realizing the partial voltage values, and example digital outputs of the A/D converter 14 corresponding to each partial voltage value in the magnetic disk apparatus according to the present invention described with reference to FIG. 2. In this example, the digital output signal of the A/D converter 14 is 5 bits. The identification circuit having the A/D converter 14 according to this embodiment, therefore, can identify 32 different specifications of the magnetic disk apparatus. According to this embodiment, in order to identify 32 specifications of the magnetic disk apparatus, each partial voltage value assumes an integer multiple of 1/32 of the reference voltage Vref. The partial voltage assumes a maximum value as a reference voltage Vref with the resistor Ru shorted.

A voltage value to be converted into a given digital signal value in the A/D converter 14 is given some margin taking the error of the resistors Rd, Ru into consideration. Specifically, an arrangement is made to produce an output of the same digital signal value within a predetermined voltage range centered at the partial voltage value of FIG. 8. In the case where the partial voltage assume values in the order of 3V, 4V, 5V and so on, for example, the digital signal corresponding to the partial voltage value of 4V is adapted to be produced in the range of 3.5V to 4.5V not inclusive.

FIG. 9 is a table showing an example of the identification information of the characteristics of the magnetic disk apparatus stored in the ROM 15 of FIG. 6 when the partial voltage values at the junction point 13 of the first resistor circuit 11 and the second resistor circuit 12 of the identification circuit 10 in FIG. 6 assumes the states shown in FIG. 8, respectively. This information is written beforehand in the ROM 15. In this example, the characteristics of the magnetic disk apparatus are judged using the first bit, the number of the magnetic disks are determined using the second bit, the characteristic of the head is judged using the third bit, and the number of heads is determined using the fourth and fifth bits of the digital signal output from the A/D converter 14.

Specifically, the R or S characteristic of the magnetic disk is judged depending on whether the first bit is 0 or 1, respectively; the number of the disks is determined to be 1 or 2 depending on whether the second bit is 0 or 1, respectively; the P or Q characteristic of the head is determined depending on whether the third bit is 0 or 1, respectively; and the number of heads is determined to be one of 1 to 4 depending on the combinations of 0 and 1 of the fourth and fifth bits.

In the identification circuit 19 configured as described above, the change-over switch 17 is operated by the control signal produced from the MCU 4. When the change-over switch 17 is in closed state, the internal impedance of the output stage of the temperature sensor 16 is high and therefore a voltage corresponding to the ratio of resistance between the resistors Rd and Ru is generated at the junction point 13 of the first resistor circuit 11 and the second resistor circuit 12. The A/D converter 14 converts the voltage value at the junction point 13 into a digital value. The MCU 4 refers to the data input thereto from the A/D converter 14 and identifies the specification information of individual magnetic disks from the value of each bit in accordance with the information described with reference to FIG. 9.

The individual specification information of the magnetic disks, once identified by the MCU 14, is transferred from the MCU 4 to the HDC 18. In this embodiment, the printed board 5 can be connected with the down-loader or tester 30. In the case where the down-loader 30 is connected, the information of the HDC 18 is read by the down-loader 30 through an interface, so that a proper program code or a read/write parameter is written on the magnetic disk. In the case where the tester 30 is connected, on the other hand, the information, after being read by the tester 30, can be collectively managed and used for production control such as for calculating the ratio of conforming articles.

As described above, in the magnetic disk apparatus shown in the embodiment of FIG. 6, the identification information of the specification of the magnetic disk is determined by the ratio of the resistance values between the resistor Ru of the first resistor circuit 11 and the resistor Rd of the second resistor circuit 12. Detailed magnetic disk information can thus be given by packaging proper resistors Ru, Rd in the fabrication process of the magnetic disks.

In the embodiments described above, as explained with reference to FIG. 8, combinations of the resistance value Rd of the first resistor circuit 11 and the resistance value Ru of the second resistor value 12 are changed in order to produce 32 different partial voltage values. Another possible method of producing the different 32 partial voltage values is to fix the resistance value of one of the resistor circuits and to change only the resistance value of the other resistor circuit.

For example, FIG. 10 is a table showing the partial voltage values at the junction point 13 of the first resistor circuit 11 and the second resistor circuit 12, examples of the resistance value Rd of the first resistor circuit 11 for realizing the partial voltage values, and examples of digital outputs of the A/D converter 14 corresponding to the partial voltage values, respectively, in the case where the resistance value of the resistor Ru of the second resistor circuit 12 is fixed in the magnetic disk apparatus according to the invention. In this example also, the digital output signal of the A/D converter 14 is 5 bits. According to this embodiment, each partial voltage value assumes one of the values equal to one to 32 times 1/33 of the reference voltage Vref and assumes a maximum value lower than the reference voltage Vref. FIG. 11 is a table showing still another example of the identification of the characteristics of the magnetic disk apparatus stored in the ROM 15 of FIG. 6. In this example, the number of bits of the digital signal output from the A/D converter 14 is 11. According to this embodiment, therefore, a total of 2048 ($=2^{11}$) combinations of head IC suppliers, the number of the heads, the head characteristics, the number of the magnetic disks, the magnetic disk characteristics and the customized information can be identified.

Now, an explanation is given of the operation of the MCU 4 when the change-over switch 17 is open. In the configuration of FIG. 6, once the change-over switch 17 opens, a voltage proportional to the internal temperature of the housing of the magnetic disk apparatus is generated at the junction point 13 as an output of the temperature sensor 16. The MCU 4 is adapted to open the change-over switch 17 and thereby check the internal temperature of the housing by monitoring the output of the A/D converter 14 at regular intervals of time.

The partial voltage of the output voltage of the temperature sensor 16 corresponding to the internal temperature of the housing and the values of the digital signal output from the A/D converter 14, as described with reference to FIG. 8 or 10, is also set at a value corresponding to the temperature at the junction point 13. FIG. 12 is a table showing an example of the relation between the digital values stored in the ROM of FIG. 6 and the temperature characteristic of the magnetic disk apparatus. In this example, the internal temperature of the housing is classified into five stages and the output voltage of the temperatures sensor is also classified into corresponding five stages. According to this embodiment, the five temperature stages are represented by the three bits including the ninth to seventh bits of the digital signal output of the A/D converter 14. If the output voltage of the temperature sensor 16 is further divided, the internal temperature of the housing can be detected more finely.

In this case, the MCU 4 can determine the internal temperature of the housing with reference to the ROM 15 based on the digital signal output from the A/D converter 14. The write current to the head IC 20 is determined by the MCU 4 from the temperature data thus obtained, and a control signal is sent to the read/write circuit 21 of FIG. 6 for setting the write current value. As a result, the optimum write current can always be selected even under different environments after shipment as well as in the manufacturing process of the magnetic disk apparatus.

The A/D converter 14 can be built into the MCU 4. In that case, the input terminals of the MCU 4 need only two including a terminal for connecting the reference voltage Vref and a terminal connected to the junction point 13.

In the above-mentioned embodiment, the output of the A/D converter 14 can have an arbitrary number of bits. Also, in spite of the fact that the identification information shown in FIG. 11 defines the characteristics of the first to fourth heads with 0 and 1 using the seventh to fourth bits, a program can be produced ignoring the third and fourth heads, for example, in the case where only two heads, the first and second heads, are present.

As described above, in the magnetic disk apparatus according to the first aspect of the invention, both the printed board and the circuit from head to actuator include resistor circuits connected in series, and the partial voltage appearing at the junction point of the two resistor circuits is A/D converted, so that the resulting digital value is recognized to identify the various specification information of the magnetic disk.

The magnetic disk information identified by the control circuit is recognized by a tester in the manufacturing process. In this way, a proper program code or a read/write parameter can be written without reading a label. Also, detailed data can be supplied for quality control, etc. of the magnetic disk apparatus.

Further, in the magnetic disk apparatus according to the second aspect of the invention, the internal temperature of the housing of the magnetic disk apparatus is detected, and the write current to the heads can be optimally controlled by the control circuit based on the detected temperature. The read/write characteristic can be improved and the write characteristic to the magnetic disk can be stabilized without causing any write expansion.

What is claimed is:

1. A magnetic disk apparatus comprising a housing, at least one magnetic disk, at least one head, an actuator for moving said head, a printed circuit board having a control circuit for processing a selected one of a write signal to said head and a read signal from said head, and an identification circuit capable of identifying the performance specification information of said magnetic disk apparatus, said actuator and said printed circuit board being connected, by a cable, to each other, said performance specification information identification circuit comprising:

a first resistor circuit having a predetermined resistance value arranged on selected one of said cable and said actuator and having an end thereof grounded;

a second resistor circuit having a predetermined resistance value arranged on said printed circuit board and having an end thereof connected to a reference voltage of said printed circuit board, the other end of said second resistor circuit being connected to the other end of said first resistor circuit through said cable;

an A/D converter for outputting by converting the voltage value appearing at the junction point of said first resistor circuit and said second resistor circuit into a digital value having a predetermined number of bits corresponding to the magnitude of said voltage value; and a memory for storing beforehand the performance specification information of said magnetic disk apparatus corresponding to a digital value having a predetermined number of bits output from said A/D converter and control information corresponding to said performance specification information; and wherein said control circuit is connected to said A/D converter and said memory judges the performance specification information of said magnetic disk apparatus on the basis of the output value of said A/D converter and the value stored in said memory, and controls said magnetic disk apparatus according to the control information corresponding to said performance specification information stored in said memory.

2. A magnetic disk apparatus according to claim 1, wherein said first resistor circuit and said second resistor circuit each include one resistor.

3. A magnetic disk apparatus according to claim 1, wherein said first resistor circuit and said second resistor circuit each include a combination of a plurality of resistors.

4. A magnetic disk apparatus according to claim 1, wherein the voltage values at said junction point corresponding to all the performance specification information of said magnetic disk apparatus, and the combinations of the resistance values of said first resistor circuit and said second resistor circuit for producing said voltage values, respectively, are predetermined, and wherein said first resistor circuit and said second resistor circuit are mounted at the time of manufacturing in a specific magnetic disk apparatus in conformance with specification information of said magnetic disk apparatus.

5. A magnetic disk apparatus according to claim 4, wherein said first resistor circuit and said second resistor circuit each include one resistor.

6. A magnetic disk apparatus according to claim 1, wherein said first resistor circuit and said second resistor circuit each include a combination of a plurality of resistors.

7. A magnetic disk apparatus according to claim 1, wherein said performance specification information of said magnetic disk apparatus represents at least a selected one of the number of said magnetic disks, the number of said heads, the characteristics of said disks, information on the head control circuit and information on the destination of said apparatus, and wherein said A/D converter outputs a digital signal having the number of bits corresponding to the amount of said performance specification information identified.

8. A magnetic disk apparatus according to claim 7, wherein the characteristics of said disks and said heads are stored separately in said memory, and said control circuit ignores the stored bit information representing the characteristics of the absent ones of said disks or said heads.

9. A magnetic disk apparatus according to claim 7, wherein said first resistor circuit and said second resistor circuit each include one resistor.

10. A magnetic disk apparatus according to claim 7, wherein said first resistor circuit and said second resistor circuit each include a combination of a plurality of resistors.

11. A magnetic disk apparatus according to claim 1, further comprising a temperature sensor connected in parallel with said first resistor circuit and having a high internal impedance, and a change-over switch inserted between the junction point of said first and second resistor circuits and said second resistor circuit; wherein said memory has stored therein temperature information corresponding to the digital value of a predetermined number of bits output from said A/D converter, and, wherein said control circuit judges the performance specification information of said magnetic disk apparatus from the output value of said A/D converter and the value stored in said memory when said change-over switch is closed, and said control circuit detects the internal temperature of said housing by monitoring the output of said A/D converter at regular time intervals when said change-over switch is open.

12. A magnetic disk apparatus according to claim 11, wherein a write current to said magnetic disk is set from time to time on the basis of the internal temperature of said housing detected by said control circuit.

13. A magnetic disk apparatus according to claim 11, wherein said first resistor circuit and said second resistor circuit each include one resistor.

14. A magnetic disk apparatus according to claim 11, wherein said first resistor circuit and said second resistor circuit each include a combination of a plurality of resistors.

15. A magnetic disk apparatus according to any one of claims 1 to 14, wherein the resistance value of one of said resistor circuits is fixed, and the voltage at said junction point is determined by changing the resistance value of the other resistor circuit.

* * * * *

UNITED STATES PATENT AND TRADEMARK OFFICE
CERTIFICATE OF CORRECTION

PATENT NO. : 5,986,842  
DATED : November 16, 1999  
INVENTOR(S) : Matsumoto et al.

Page 1 of 1

It is certified that error appears in the above-identified patent and that said Letters Patent is hereby corrected as shown below:

Title Page,
Under "[57] Abstract" please delete "efficiently," and insert -- efficiently and -- therefor Column 3,
Line 31, after "can" insert -- be --

Column 9,
Line 15, delete "MCU 14" and insert -- MCU 4 -- therefor
Line 23, delete "14" and insert -- 4 -- therefor Column 10,
Line 49, delete "14" and insert -- 4 -- therefor Column 12,
Line 2, after "two" insert -- , -- (comma)

CLAIMS:

Claim 6,
Line 1, delete "1" and insert -- 4-- therefor.

Signed and Sealed this

Twenty-first Day of August, 2001

*Attest:*

NICHOLAS P. GODICI
*Attesting Officer*  *Acting Director of the United States Patent and Trademark Office*